United States Patent [19]

Rozak et al.

[11] Patent Number: 4,898,091

[45] Date of Patent: Feb. 6, 1990

[54] SELF VENTING FOOD FRYING APPARATUS

[76] Inventors: Alexander T. Rozak, #1, 722 - 5A St. N.W., Calgary, Alberta, Canada, T2N 1R4; Gary G. Calderwood, 2008-31 Ave. S.W., Calgary, Alberta, Canada, T2T 1T2

[21] Appl. No.: 306,920

[22] Filed: Feb. 6, 1989

[51] Int. Cl.⁴ .............................................. A47J 37/12
[52] U.S. Cl. ........................................ 99/336; 99/337; 99/344; 99/403; 99/407
[58] Field of Search .................. 99/336, 333, 337, 344, 99/403, 409, 407, 410, 411, 412, 413, 331; 236/1 A, 1 B, 1 H; 55/316, 387, DIG. 36; 126/387, 365, 391; 16/114 A, 114 R, 110 A; 169/65

[56] References Cited

U.S. PATENT DOCUMENTS

| | | | |
|---|---|---|---|
| 3,818,820 | 6/1974 | Harris et al. | 99/336 |
| 3,981,232 | 9/1976 | Williamson | 99/337 |
| 4,450,757 | 5/1984 | Alfio | 99/407 |
| 4,489,647 | 12/1984 | Stamps et al. | 99/336 |
| 4,520,717 | 6/1985 | Bohrer, Jr. et al. | 99/411 |
| 4,539,898 | 9/1985 | Bishop et al. | 99/336 |
| 4,724,825 | 2/1988 | Fritsch et al. | 126/357 |

Primary Examiner—Timothy F. Simone

[57] ABSTRACT

Self venting food frying apparatus is disclosed which provides apparatus which is capable of deep frying small portions of various food products without need for external venting. In one embodiment, the food frying apparatus includes an upright cabinet with a fan assembly mounted to exhaust air through the top of the cabinet while drawing air in through and from the lower portion of the cabinet. A removable sealing system and a removable one piece filter is in the air flow path to remove smoke, odors and particulate matter from the air before being exhausted back into the room. The removable filter includes flat lying layers of paper and activated charcoal configured as an integral unit. A container for holding a supply of cooking oil is located in the lower portion of the cabinet. Spill tray, oil container and heating element are configured as a fully removable unit. Mechanism is provided for automatically lowering a cooking basket, with food therein, into the cooking oil for a predetermined time and then raising the cooking basket from the oil. Control systems are configured as a removable integral unit. Self-diagnostic features are built into the control systems.

19 Claims, 7 Drawing Sheets

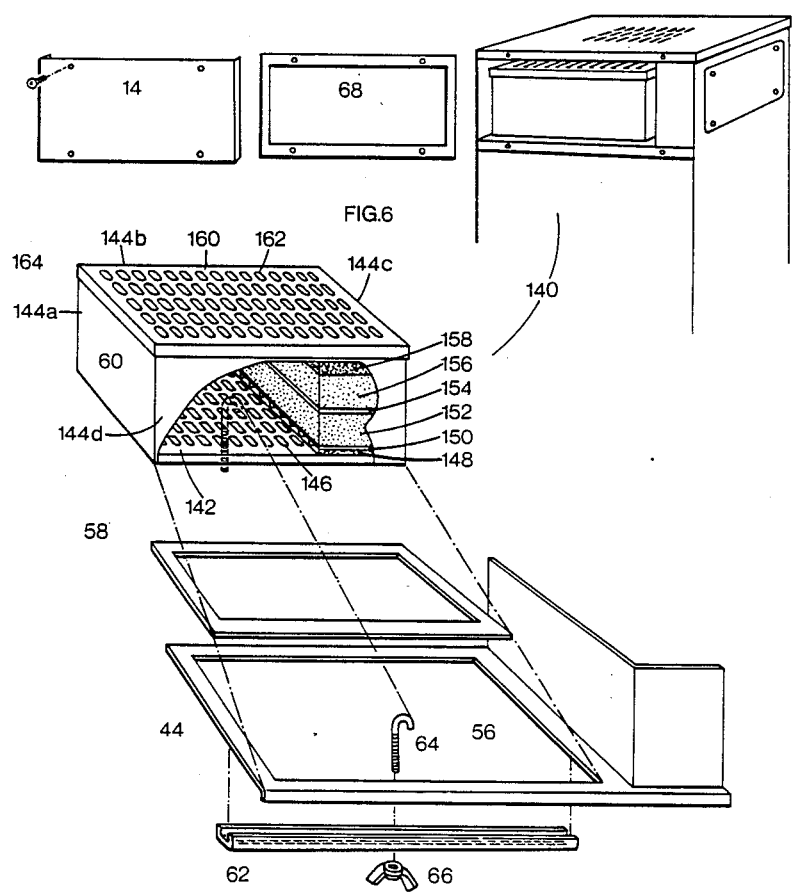

SELF VENTING FOOD FRYING APPARATUS

The present invention refers in general to food preparation. More particularly, this invention relates to apparatus for the deep fat frying of food in a retail environment while essentially eliminating the introduction of smoke and/or odor into the surrounding environment.

Although the present invention is applicable for the deep fat frying of numerous types of food products, it has been found to be particularly useful in the frying of frozen french fry cut potato pieces or breaded-type snack foods in a bar or fast food environment. Therefore, as not to limit the application of this invention to particular food products, the invention will be described in this environment.

Deep fat fryers are widely used in the restaurant business for cooking various food products, such as french fried potatoes, chicken, and fish. Typically such french fryers comprise a deep tank containing a pool of cooking oil in the lower part of the tank with the cooking oil being heated by an immersed electric heating element or by gas flame. The uncooked product is placed in a basket which is lowered into the heated oil for the desired cooking period. When the product is done, as determined by visual inspection by the restaurant employee, or by the sound of an audio timer, the basket should be removed from the oil by the employee, drained, and the product served to the customer.

With the advent of convenience stores, and the present market trends towards fast food sales in these locations, the need to provide hot fresh food products such as those mentioned above has increased. The equipment to fill this need must be easily and safely operated by the employee, reliable, easy to clean and service and not pollute the surrounding environment.

In the Prior Art, various machines are known for processing and dispensing small batches or individual servings of a food product such as french fried potatoes.

U.S. Pat. No. 3,818,820 discloses an automatic machine for preparing fried potato product which includes a food hopper, a slidable ejection scoop for dispensing product into a cooking basket, a means to immerse the product in cooking oil for a predetermined time, and a means to pivot the basket and drop the potato product into a waiting container. The machine also contains a fan to extract the fumes via a replaceable charcoal filtering unit. An automatic fire extinguisher unit is mounted near frying container to extinguish the oil if it should catch fire.

U.S. Pat. No. 3,981,232 discloses a free standing deep fat fryer with a fry container located in the interior of a cabinet. The cabinet includes an upper portion which houses a fan means for extracting air and fumes from the cabinet and forcing same through filter means which includes charcoal. A fire extinguisher is also disclosed.

U.S. Pat. No. 4,520,717 discloses an enclosed free standing deep fat fryer with a fan and filter means for extracting air and fumes from the cooking area. Disclosed is an integral means for heating the cooking oil. A fire extinguisher is also disclosed.

U.S. Pat. No. 4,539,898 discloses an enclosed free standing deep fat fryer with a fan and filter means for extracting air and fumes from the cooking area. Disclosed is an integral means for heating the cooking oil. A means for automatically lowering a cooking basket containing food into a vat containing cooking oil for a predetermined time and then raising the cooking basket out of the oil is disclosed. A fire extinguisher is also disclosed.

The present invention as claimed is intended to solve various prior art deficiencies, related reliability problems of complex mechanisms, food storage and spoilage mechanisms, high operational costs, maintenance and repair problems. Almost all machines have problems with pollution of the surrounding environment, due mainly to a lack of sealing systems which allow bypass around and leakage of unfiltered air through the filter system. In addition, many machines do not allow simple disassembly for cleaning and easy replacement of parts.

BRIEF DESCRIPTION OF THE DRAWING

FIG. 5 is a simplified perspective view of the filter unit (portions of the filter unit housing being displaced to expose internal elements to view) and first sealing system and its relationship to the plenum plate (outer cabinet body is removed for ease of viewing) of the self venting food frying apparatus according to the present invention;

FIG. 6 is a simplified exploded view of the second sealing system of the self venting food frying apparatus according to the present invention;

DESCRIPTION OF THE PREFERRED EMBODIMENT

Figure 1:
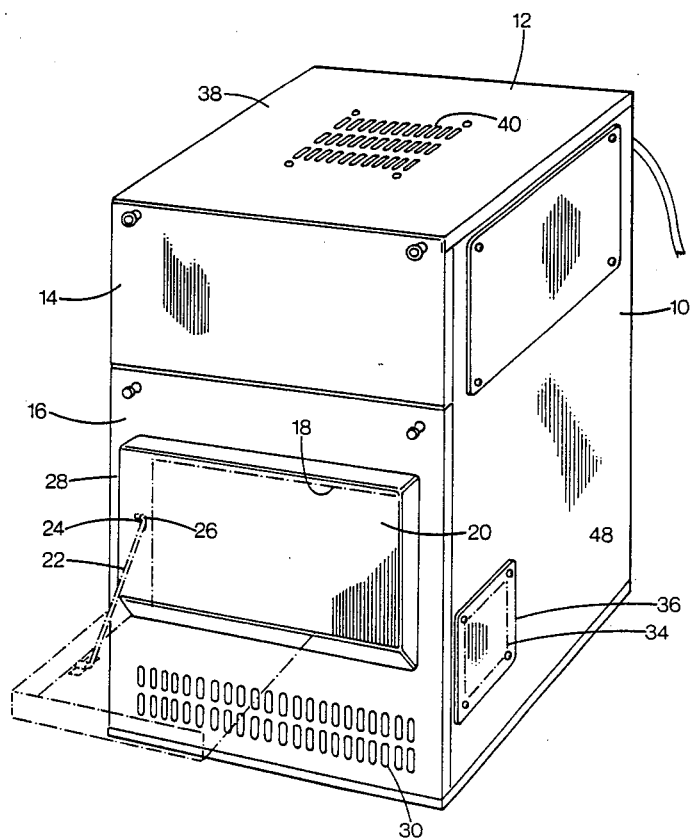
FIG. 1 is a simplified perspective view of the self venting food frying apparatus according to the present invention.
Figure 2:
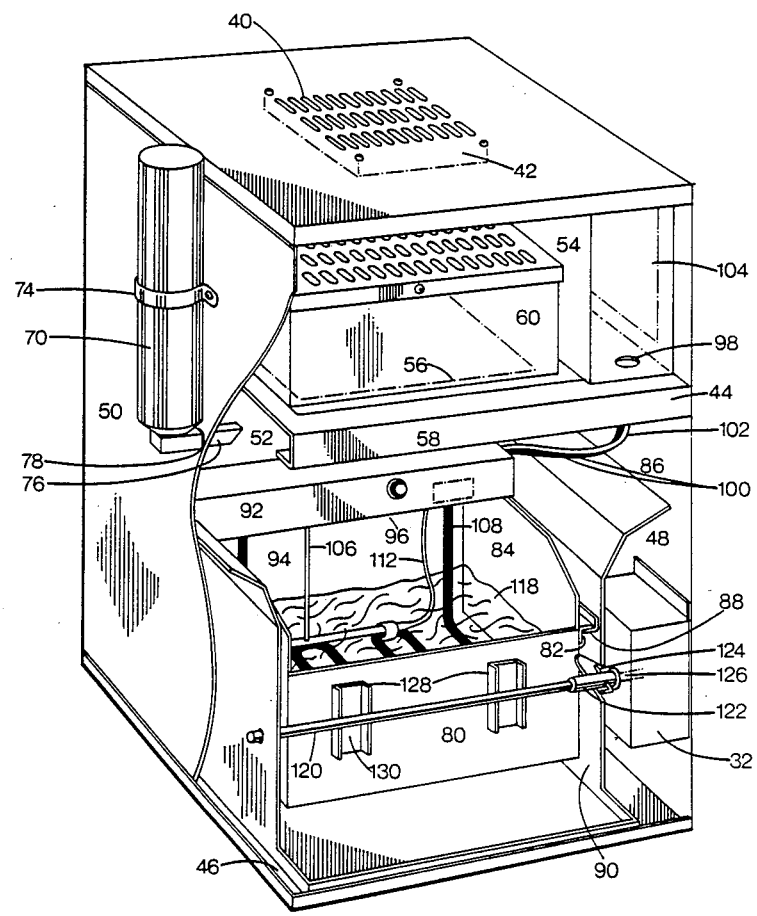
FIG. 2 is a simplified perspective view of the self venting food frying apparatus according to the present invention with portions of the cabinet being displaced to expose apparatus to view.

Referring to the drawing, particularly FIGS. 1 and 2 self venting food frying apparatus according to present invention is generally referred to by reference numeral 10. The self venting food frying apparatus 10 includes an upright cabinet 12 which is generally rectangular in shape in side profile. Access to the inside portions of upright cabinet 12 is provided by various means which includes a removable upper portion cover 14, a removable lower portion cover 16, an opening 18 in the lower portion cover 16. Opening 18 is coverable by a pivotal tray or door 20 which is attached by hinge means (not shown) to front portion 16 such that tray or door 20 may pivot downwardly to a generally horizontal position as shown (partially) in phantom. Tray or door 20 is supported in the generally horizontal position by two support rods 22 (only one being shown), one support rod 22 being at each end of tray or door 20. The upper end of each support rod 22 is mounted for sliding movement through aperture 24 of support bracket 26 (only one being shown) with each support bracket 26 being mounted to flange 28 defining opening 18. Positioned below opening 18 are air inlet openings 30 of predetermined size, position and number.

Motor box 32 is welded to the inside surface of side panel 48 aligning with opening 34. Motor box cover 36 is held against opening 32 by fasteners.

Cabinet top 38 includes air outlet openings 40, of predetermined size, shape and number. Fan assembly 42 is attached to the underside of cabinet top 38 such that the exhaust opening of fan assembly 42, shown in phantom, is aligned with air outlet openings 40.

Plenum plate 44 comprising formed sheet metal of a predetermined shape is located at a predetermined height above floor panel 46 and is attached to side panels 48 and 50, rear panel 52 and control box partition 54. Plenum opening 56 is located in plenum plate 44. A first removable one piece gasket, filter seal 58 overlies plenum plate 44 such that the opening in the filter seal 58 is aligned with plenum opening 56. Removable filter unit 60 rests on top of filter seal 58. Plenum plate 44 divides the self venting food frying apparatus 10 into an upper portion and a lower portion. The upper portion being where the air is cleaned before it is exhausted to the surrounding air through outlet openings 40. The lower portion is the food preparation or frying area. Fire extinguisher 70 is attached externally to side panel 50 by fastening means 74. Head and sensor portion 76 extends through aperture 78 into the lower portion. When the head and sensor portion 76 senses a fire, the fire extinguisher 70 is automatically activated to extinguish the fire.

Container or vat 80 has first vat support rail 82 (only one is shown) welded to the vat vertical end 84 (only one shown) at a predetermined height. Spill tray 86 has second vat support rail 88 welded to the tray vertical side 90 at a predetermined height to hold the vat or container 80 suspended away from contact with the spill tray 86. Heater element control box 92 is held in position on the vat or container back 94 by retainer 96. Spill tray 86, container or vat 80 and heater element box 92 are configured to slide out of lower portion of self venting frying apparatus 10 as a single unit for ease of service and cleaning. Aperture 98 is formed in plenum plate 44 to allow the power wire 100 and the thermocouple wire 102 to operatively engage controlled components in heater element control box 92. Power wire 100 and thermocouple wire 102 are operatively connected to circuitry in control box 104 and to heater element control box 92. Thermocouple 106 is operatively connected to thermocouple wire 102 and is positioned in heater element control box 92 such that the distal end is covered in cooking oil 118. Heater element 108 is positioned in heater element box 92 such that the distal end of the element is covered in cooking oil 118. Over temperature controller 110, in phantom, is located in heater element control box 92 with capillary tube and sensor 112 extending through an aperture in the bottom of heater element box and connected with a clip or keeper under heater element 108. Over temperature controller 110 is operatively connected between capillary tube and sensor 112, power wire 100, heater element 108 and heater light 114.

Figure 3:
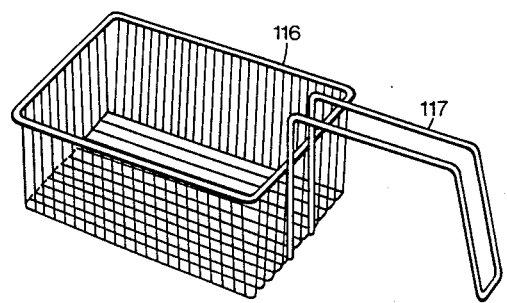
FIG. 3 is a simplified perspective view of a cooking basket of the self venting food frying apparatus according to the present invention.

With reference to FIG. 3 cooking basket 116 is generally rectangular in shape and formed of predetermined lengths of wire. Handles 117 in one embodiment are formed as part of the wire forming the periphery of the top portion of the cooking basket 116.

Figure 4:
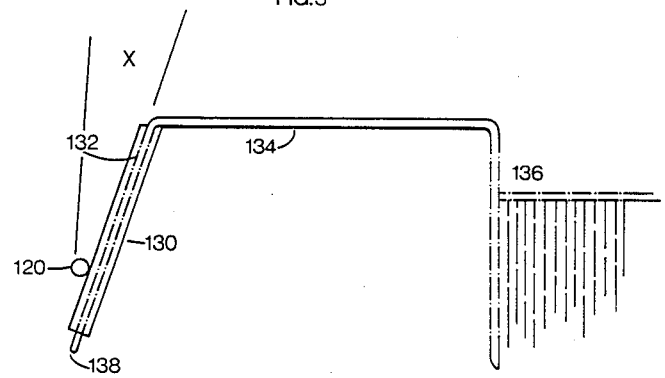
FIG. 4 is a simplified side elevational view of a handle guide and holder device used in conjunction with a cooking basket of the self venting food frying apparatus according to the present invention.

With reference to FIGS. 2 and 4, the means for holding cooking basket 116 and automatically lowering the cooking basket 116 into the cooking oil 118 for a predetermined time and then raising the cooking basket 116 out of the cooking oil 118 is disclosed. Shaft 120 is positioned across and near the front of container or vat 80 and is supported for rotational movement of 15 to 30 degrees. One end of shaft 120 uses coupling means 122 and fastening means 124 to removably attach it to shaft 126, in phantom, extending from motor box 32. The opposite end is supported by a bearing journal formed at a predetermined location on spill tray 86. Attached at predetermined locations are handle guides and holders 128 which include a handle guide and support portion 130. Shaft 120 is positioned to also act as a stop portion. For ease of explanation, the particular embodiment of handle 117 is shown as having three distinct sections; first section 132, second section 134 and third section 136. Shaft 120 and attached handle guides and holders 128 which include a handle guide and support portion 130 are shown in the position which places cooking basket 116 down into cooking oil 118. First section 132 is placed in handle guide and support portion 130 (which comprises a U-shaped channel section) until end portion 138 of first section 132 extends past shaft 120 and protrudes beyond handle guide and support portion 130. With reference to FIG. 4, cooking basket produces a clockwise torque with respect to handle guides and holders 128 which is offset by the location of shaft 120 (which prevents end portion 138 from rotating clockwise) and handle guide and support portion 130 (which prevents first section 132 from moving or rotating clockwise). The cooking basket 116 is positioned by and follows the rotational movement of shaft 120. When the cooking basket 116 is positioned down into the cooking oil 118, as shown in FIG. 4, X is approximately 15 to 20 degrees and represents the approximate angle from the vertical of first section 132.

With reference to FIG. 5 and 6 the plenum sealing means 140 is disclosed. (Outer shell of the cabinet is removed for viewing in FIG. 5) The removable filter unit 60 comprises a single piece which (in the embodiment in which it is employed) rests on and is supported by filter seal 58 which in turn rests on and is supported by plenum plate 44. Plenum sealing means 140 comprises filter seal, cross bar 62, tension hook 64, wing nut 66, cover seal 68, and upper portion cover 14. Cross bar 62 comprising of channel shaped metal of predetermined length with one hole located in a predetermined position. A thin steel shaft bent to a predetermined shape at one end and threaded at the opposite end, tension hook 64. The bent end of tension hook 64 extends through plenum opening 56 engaging a corresponding perforation 72 in filter unit 60. The threaded end of tension hook 64 is inserted in the hole of cross bar 62. Wing nut 66 is threaded onto the end of tension hook that protrudes through the hole of cross bar 62. Tightening wing nut 66 causes cross bar 62 to be drawn upward until contact is made with the underside of plenum plate 44, with cross bar 62 spanning plenum opening 56. Further tightening of wing nut 66 causes deformation of filter seal 58 producing an airtight seal. A second removable one piece gasket, cover seal 68 of predetermined shape is placed between upper portion cover 14 and the upper portion of the cabinet. Fastening means attach the upper portion cover 14 and the cover seal 68 to the upper portion of the cabinet, forming an airtight seal.

With reference to FIG. 5, the removable filter unit 60 is disclosed. Filter means 60 (in one embodiment) comprises a box, rectangular in side view, with perforated floor portion 142 recessed a predetermined amount, leaving side panels 144a, 144b, 144c and 144d equal amounts beyond perforated floor portion 142. Perforations 146 in perforated floor portion 142 are of a predetermined size, number, shape and location. Overlying and being supported by perforated floor portion 142 is pleated paper element 148 of a predetermined size and shape. Overlying and being supported by pleated paper element 148 is a first flat paper element, 150 of a predetermined size and shape. Overlying and being supported by first flat paper element 150 is a predetermined quantity of first activated charcoal 152. Overlying and being supported by first activated charcoal 152 is second flat paper element 154 of predetermined size and shape. Overlying and being supported by second flat paper element is a predetermined quantity of second activated charcoal 156. Overlying and being supported by the second activated charcoal is a retainer element 158 of a highly compressible non-woven material (in present embodiment polyester is used) of predetermined size and shape. Filter top portion 160 uses perforations 162 of a predetermined size, number and location to allow the outward flow of air from the filter. Filter top portion is flat in shape with the edges 164 bent downward to form a friction fit around the outside of box sides 144a, 144b, 144c, and 144d. Fastening means 166 at the front of the filter unit 60 further secure the filter top portion 160 to the filter unit 60. Smoke and vapors generated through the cooking process are drawn through the filter unit by fan assembly 42 and cleared of particulate matter at pleated paper element 148. First flat paper element 150 serves to clear particulate matter and to restrict and slow air passage through first activated charcoal 152, allowing maximum initial fume scrubbing to occur. Second flat paper element 154 serves to further restrict and slow air passage to allow maximum final fume scrubbing in second activated charcoal. Retainer element 158 serves to hold second activated charcoal in position when compressed by filter top 160 and secured using fastening means 166. The flat lying attitude of the filtering layers take advantage of the forces created by gravity and the vibration of both the first and second fan means to create tighter packing of the activated charcoal over time. This design keeps filter efficiency at a maximum by ensuring that an equal thickness of activated charcoal is present throughout the entire filter. The design also allows maximum residence time of fume laden air in the activated charcoal, resulting in a maximum amount of surface adsorption of fumes by the activated charcoal. The filter unit 60 may be easily replaced and the filter components contained therein may also be easily replaced when they become clogged and dirty.

Figure 7:
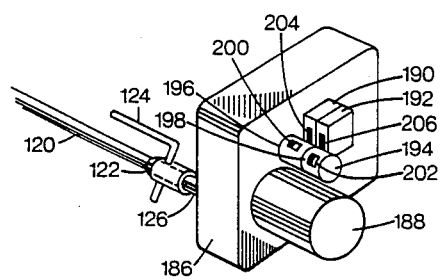
FIG. 7 is a simplified perspective view of the mechanism to automatically lower and raise the cooking baskets of the self venting food frying apparatus according to present invention.

With reference to FIG. 7, means for rotating shaft 120 and automatically lowering cooking basket 116 into cooking oil 118 for a predetermined time and then raising the cooking basket 116 out of the oil 118 is disclosed and comprises gear box 186 containing a predetermined number of reduction gears (not shown) operatively connected between a reversible DC motor 188 and motor shaft 126. The reversible DC motor 188 is attached to the side of the gear box 186, as are two microswitches 190 and 192. Protruding through the wall of gear box 186 and operatively positioned with respect to microswitches 190 and 192 is a rotatable shaft 194 which is driven by the reduction gears in gear box 186. Mounted on rotatable shaft 194 to rotate therewith are sleeves 196 and 198. Sleeves 196 and 198 include cutouts or depressions 200 and 202, respectively. The depression or release of switch levers or reeds 204 and 206 by sleeves 200 and 202 and cutouts or depressions 200 and 202 result in microswitches 190 and 192 being activated and/or inactivated. Microswitches 190 and 192 control the polarity of the DC drive voltage applied to the reversible DC motor 188 to determine the direction of rotation thereof.

Figure 8:
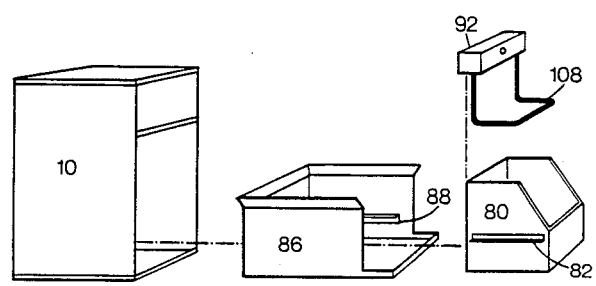
FIG. 8 is a simplified exploded assembly view of the main cabinet, spill tray, pot or container, heater element box and heater element with non-essential details omitted.

FIG. 8 discloses an exploded assembly view of the relationship between the main cabinet body of the self venting food frying apparatus 10, the spill tray 86, the container or vat 80, the heater element 108 and the heater element box 92. Heater element box 92 slides down and is secured onto the back of container or vat 80, with heater element 108 suspended close to, but not touching, the bottom of container or vat 80. Container or vat 80 slides into spill tray 86, supported by rails 82 and 88. Spill tray 86 then slides into, and rests on the floor of, the lower portion of self venting food frying apparatus 10.

Figure 9:
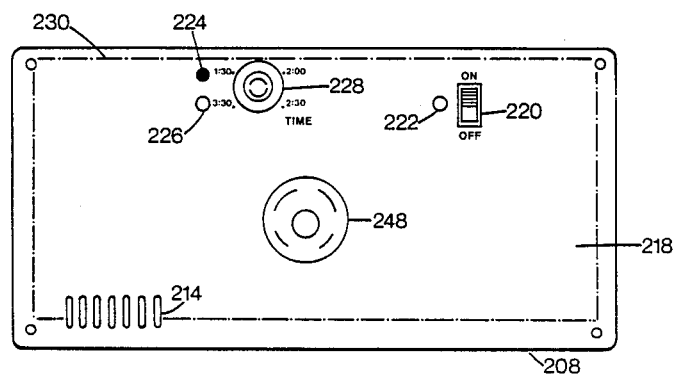
FIG. 9 is a front view of the electronic face plate.
Figure 10:
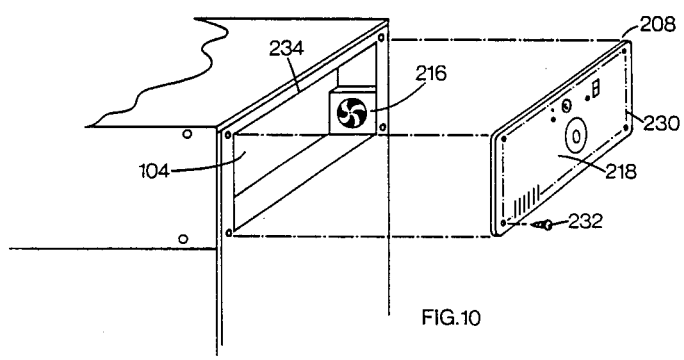
FIG. 10 is an exploded view of the electronic faceplate and its relationship to the electronic control box.

With reference to FIGS. 9 and 10, the electronic control box 104 and removable electronic control means 208 are disclosed. Electronics cooling fan assembly 216 is attached to the back wall of the self venting food frying apparatus 10 such that the exhaust opening of electronics cooling fan assembly 216 is aligned with electronic cooling outlet openings (not shown). Removable electronic control means 208 comprises a face plate 218 with electronic cooling inlets 214 of a predetermined size, shape and number, main power switch 220, main power light 222, timer switch 224, cook cycle light 226, timer adjust 228 protruding so as to be accessible to the outside of the self venting food frying apparatus 10. Removable electronic control means 208 further comprising of a single printed wire board 230 mounted with all control components to activate and control the self venting food frying apparatus 10 (control components not shown). All connections between the printed wire board 230 and the machine operation leads (not shown) are slidably fitting connectors (not shown) allowing the removable electronic control means 208 to be easily and quickly replaced in the event of a failure of the system. Fastening means 232 secure the removable electronic control means 208 to the electronic control box opening 234.

Figure 11:
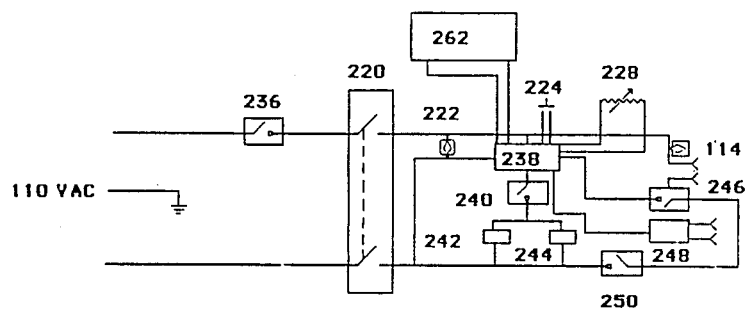
FIG. 11 is a simplified schematic diagram of the electrical power and safety elements of the self venting food frying apparatus according to present invention.

With reference to FIG. 11, the electrical portion of the self venting food frying apparatus 10 for activating various elements and for removing power for safety reasons under predetermined conditions is shown. Switch means 236 is associated with fire extinguisher 70 and is normally closed. Switch means 236 is opened when the head and sensor portion 76 senses a fire in the self venting food frying apparatus 10 and power is removed from the apparatus. Main power switch 220 provides the manual means for applying power to or removing power from the self venting food frying apparatus 10. Main power light 222 lets the operator know when power is applied to the self venting food frying apparatus 10. Microprocessor 238 controls switch means 240 which controls motor 242 in fan assembly 42 and motor 244 in electronics cooling fan assembly 216. Switch means 246 is controlled by microprocessor 238 and is normally closed. When the temperature of the container or vat 80 just meets or exceeds a predetermined temperature, that temperature is sensed by temperature sensor circuit 248 and the data is fed to microprocessor 238 which then deactivates switch means 242, removing power from heater element 108 and heater light 114. When the temperature of container or vat 80 drops below a predetermined temperature, temperature sensor circuit 248 feeds data to microprocessor 238 which activates switch means 242, applying power to heater element 108. The continued cycling will keep cooking oil 118 within proper limits for cooking food products. Switch means 250 is associated with over temperature controller 110 and will remove power from heater element 108 if the temperature of the cooking oil 118 exceeds a predetermined value. Timer switch 224 is operatively connected to microprocessor 238 and timer adjust 228.

Figure 12:
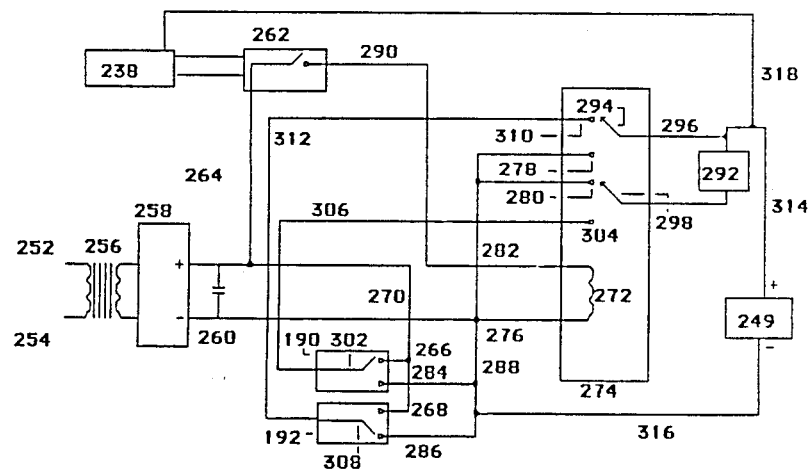
FIG. 12 is a simplified schematic diagram of the electrical portion of the mechanism to automatically lower and raise the cooking basket of the self venting food frying apparatus according to present invention.

With reference to FIG. 12, the electrical portion of the mechanism to automatically lower and raise the cooking basket of the self venting food frying apparatus 10 is shown. Input voltage of 110 volts is applied to the primary transformer 256 via terminals 252 and 254 of FIG. 12. The output (approximately 24 volts AC) of transformer 256 is applied to a full wave bridge rectifier 258 whose DC output is applied across filter capacitor 260. The positive output of full wave bridge rectifier 258 is applied to switch means 262 via lead 264, to terminal 266 of microswitch 190 and to terminal 268 of microswitch 192 via lead 270. The negative output of full wave bridge rectifier 258 is applied to one side of coil 272 of relay switch 274 via lead 276, to terminals 278 and 280 of relay switch 274 via lead 282, to terminal 284 of microswitch 190 to terminal 286 of microswitch 192 via lead 288. The other side of coil 272 is tied to switch means 262 via lead 290. Reversible DC motor 292 is tied to wiper 294 of relay switch 274 via lead 296 and to wiper 298 via lead 300. Wiper 302 of microswitch 190 is tied to terminal 304 of relay switch 274 via lead 306. Wiper 308 of microswitch 192 is tied to terminal 310 of relay switch 274 via lead 312. The positive terminal of buzzer 248 is tied to reversible DC motor 292 via lead 314. The negative terminal of buzzer 248 is tied to the negative output of full wave bridge rectifier 258 via lead 316.

The self venting food frying apparatus 10 is a small compact unit which can easily be placed on a counter top in a convenience store or bar establishment. The food frying apparatus can be plugged into any convenient outlet as it operates on a 110 volt 15 amp source. At the beginning of a business day, an employee checks container or vat 80 to ensure that the proper amount of cooking oil 118 is present, adding if necessary. With reference to FIGS. 1, 2, 11, and 12, the main power switch 220 is moved to the "on" position, which applies power to the printed wire board 230, motor 242 in fan assembly 42, heater element 108, motor 244 in electronics cooling fan assembly 216, main power light 222 and heater light 114. Microprocessor 238 conducts a self-test program to ensure that all systems are functioning properly, and the heating begins. If errors are encountered in any operational system, microprocessor 238 aborts start-up procedures and activates beeper 248 notifying the operator of a failure in the system. Fan assembly 42 draws air into the lower portion of the self venting food frying apparatus 10 through air inlet openings 30. The air would be drawn through the pleated paper element 148, through the first flat paper element 150, through the first activated charcoal 152, through the second flat paper element 154, through the second activated charcoal 156, through the retainer element 158 and into the upper portion of self venting food frying apparatus 10. Filter means 60 removes the smoke, particulates fumes and odors from the cooking processes which take place in the lower portion of the self venting food frying apparatus 10 before the air is discharged back into the room through air outlet openings 40 by fan assembly 42. When heater light 114 has cycled off indicating the cooking oil 118 has reached the proper temperature, the self venting food frying apparatus 10 is ready to fry food. The operator would then place the food portions in basket 116, open door 20, place the basket into the lower portion of cabinet 12 and position the handle 117 into the guides or holders 128 and then close the door 20. Basket 116 is being held out of the cooking oil 118 at this time. The operator selects cooking time by adjusting timer adjust 228 and begins the cook cycle by depressing switch means 224 which activates timing program in microprocessor 238. Microprocessor 238 reads the time selected on timer adjust 228 then closes switch means 262, energizing coil 272. Wiper 294 is pulled down to contact terminal 278 and connects the negative terminal of the full wave bridge rectifier 258 to lead 296 of reversible DC motor 292. Wiper 298 is pulled down to contact terminal 304 and connects the positive terminal of the full wave bridge rectifier 258 through terminal 266 and wiper 302 of microswitch 190 to lead 300 of reversible DC motor 292. Reversible DC motor 292 starts to rotate in a desired first direction to cause cooking basket 116 to be lowered into cooking oil 118. When the reversible DC motor 292 starts to rotate, so do sleeves 196 and 198 and cutout or depression 202, causing switch reed 206 to be depressed by the surface of sleeve 198 and therefore moving wiper 308 from terminal 286 to terminal 268 resulting in terminal 310 being connected to the positive output of full wave bridge rectifier 258. The reversible DC motor 292 continues to run until depression 200 allows switch reed 204 to be removed from the surface of sleeve 196 which moves wiper 302 from terminal 266 to terminal 284 which connects terminal 304 to the negative output of the full wave bridge rectifier 258 and stops the reversible motor 292. When the microprocessor 238 times out, switch means 262 opens and coil 272 is de-energized. Wiper 294 goes up to contact terminal 310 and wiper 298 goes up to contact terminal 280. Lead 296 now has a positive voltage applied to it and lead 300 has a negative voltage applied to it, so the reversible DC motor 292 is energized to run in a second and opposite direction and cooking basket 116 is lifted from cooking oil 118, draining the product. When cutout or depression 202 is positioned to allow switch reed 206 to be removed from the surface of sleeve 198, wiper 308 is moved from terminal 286 to terminal 268 and the reversible DC motor 292 is stopped. During the period that lead 296 has a positive voltage and the food is being lifted out of the cooking oil 118, lead 314 has a positive voltage, lead 316 has a negative voltage, activating buzzer 248 so informing the operator that the food products are cooked and ready for removal.

Although the present invention has been described in conjunction with specific form thereof, it is evident that many alternatives, modifications and variations will be apparent to those skilled in the art in light of the foregoing disclosure. Accordingly, this description is to be construed as illustrative only and is for the purpose of teaching those skilled in the art the manner of carrying out the invention. Various changes may be made in the shape, size and arrangement of parts. It will be appreciated that various modifications, alternatives or variations may be made without departing from the spirit and scope of the invention as defined in the appended claims.

The embodiments of the invention in which an exclusive property or privilege is claimed are defined as follows:

1. Self venting food frying apparatus adapted for use in an enclosed space without connection to an outside exhaust system, said apparatus comprising:
   a cabinet adapted to be supported at a suitable working height and having a top panel, side panels, a rear panel an upper front panel and a lower front panel at least one of said panels being configured to allow access to the interior of said cabinet;
   a container located in said cabinet for holding a supply of cooking oil;
   means non-integral with said container for heating said container;
   a spill tray system comprising an integral means to support said cooking oil container and said means non-integral with said container for heating said container;
   means for supporting food products in the cooking oil during the cooking process, said means for supporting food products includes a handle means, and
   means to hold said means for supporting food products while automatically lowering said means for supporting food products into said supply of cooking oil for a predetermined time and then raising said means for supporting said means for supporting food products out of said supply of cooking oil, said means for supporting food products being held by said means to hold by using and resisting the force of gravity and rotation to said means to hold through said means or supporting food products without the requirements for releasable latching means, said means to hold comprising:
   (a) means to engage said handle in a slidably fitting relationship while supporting same, said means to engage comprises at least one U-shaped channel device configured to be capable of supporting said handle means along three separate surfaces;
   (b) rotatable means attached to said means to engage and capable of rotating in both directions within defined limits, said rotatable means further comprising integral stop means attached to a predetermined location of said U-shaped channel device to engage a fourth surface of said handle means;
   (c) means to provide a rotatable force to said rotatable means, and
   (d) means to control the means to provide a rotatable force such that the rotatable force is controlled in amount of time of application as well as direction.

2. The apparatus of claim 1 wherein said rotatable means comprises a shaft of predetermined length and diameter.

3. The apparatus of claim 1 wherein said means to provide a rotatable force comprises a reversible DC motor operatively connected to said rotatable means.

4. The apparatus of claim 3 wherein said means to control comprises a timer switch operatively connected to an up limit switch and a down limit switch to control the application and polarity of a DC supply voltage to said reversible motor.

5. The apparatus of claim 1 further including:
   a first blower means located in said cabinet for circulating air through said self venting food frying apparatus along a predetermined path and exiting at a first predetermined location;
   a second blower means located in said cabinet designed to circulate air along a second predetermined path and exiting at a second predetermined location;
   a filter unit removably positionable, as a one piece unit in said predetermined air path and upstream from said blower means, said filter comprising of a predetermined number of alternating layers of charcoal and paper elements and other predetermined filtering materials, said filter unit utilizing the forces of gravity and vibration of said first and second blower means to increase the packing of said alternating layers of charcoal and paper elements;
   a sealing system coupling said filter unit to said cabinet.

6. The apparatus of claim 5 wherein said filter unit in preferred embodiment comprises:
   a box of predetermined size and shape with removable perforated top and with a secure perforated bottom, said perforated bottom being recessed a predetermined amount;
   a corrugated paper element overlying and resting against said perforated bottom;
   a first flat paper element overlying and resting against said corrugated paper element;
   a first predetermined amount of charcoal overlying and resting against said first flat paper element;
   a second flat paper element overlying and resting against said first predetermined amount of charcoal;
   a second predetermined amount of charcoal overlying and resting against said second flat paper element;
   a retainer sheet of predetermined size and material overlying and resting against said second predetermined amount of charcoal, over which is secured said perforated top.

7. The apparatus of claim 6 wherein said charcoal is activated charcoal.

8. The apparatus of claim 5 further including a plenum plate positioned to divide the interior of said cabinet into an upper portion and a lower portion.

9. The apparatus of claim 8 wherein said filter unit is coupled using said sealing system to said plenum plate.

10. The apparatus of claim 8 wherein said sealing system comprises:
    at least one piece of predetermined sealing material shaped in a predetermined form and predetermined thickness placed between said filter unit and said plenum plate,
    at least one means for coupling said filter unit to said plenum plate to form an airtight seal between the said filter unit and said plenum plate.

11. The apparatus of claim 1 further including a fire extinguisher positioned external to said cabinet, said fire extinguisher including a discharge head and a sensor positioned in said lower portion, said fire extinguisher including means for removing power to said food frying apparatus upon activation of said fire extinguisher.

12. The apparatus of claim 1 further including first means for sensing the temperature of said container for holding a supply of cooking oil and for adding to or removing power from said means for heating said container to maintain temperature in a predetermined range.

13. The apparatus of claim 1 further including a second means for sensing the temperature of said container for holding a supply of cooking oil and for adding to or removing power from said means for heating said container to maintain temperature in a predetermined range.

14. The apparatus of claim 1 wherein said lower front panel includes:
    an opening therein
    a door which is pivotably attached to said front panel at
    a lower edge of said opening, and
    support means integral with said front door such that said door is supported in a horizontal position when said door is pivoted from a closed position with respect to said opening.

15. The apparatus of claim 8 wherein said upper front panel is removably coupled to the outside of said upper portion.

16. The apparatus of claim 15 further including a second sealing system comprising of:
    at least one piece of predetermined sealing material of predetermined shape and predetermined thickness placed between said upper front panel and said upper portion;
    at least one means of coupling said upper front panel to said upper portion so that an airtight seal is created.

17. The apparatus of claim 8 wherein said upper portion further including a partitioned area of predetermined size and position configured so that electronic control system means configured of predetermined components can be contained therein.

18. The apparatus of claim 17 wherein said partitioned area including at least one access plate which is removably attached to said electronic control system, said electronic control system configured of predetermined controlling components operatively connected removably to predetermined controlled components, said access plate and said electronic control system comprising a removably attached integral unit.

19. The apparatus of claim 18 said electronic control system comprising at least one microprocessor configured to conduct self-tests of all operational systems and to notify operator of operational system failures and to abort operation in the event of said failures.

* * * * *